US009877296B2

(12) United States Patent
Kelly (10) Patent No.: US 9,877,296 B2
(45) Date of Patent: Jan. 23, 2018

(54) ELECTRONIC TAG WITH CELLULAR COMMUNICATION MODULE (71) Applicant: EC Solution Group B.V., Warmond (NL)

(72) Inventor: Graham Michael Kelly, Herts (GB)

(73) Assignee: EC SOLUTION GROUP B.V., Warmond (NL)

( * ) Notice: Subject to any disclaimer, the term of this patent is extended or adjusted under 35 U.S.C. 154(b) by 0 days.

(21) Appl. No.: 15/107,382

(22) PCT Filed: Dec. 9, 2014

(86) PCT No.: PCT/EP2014/077019
§ 371 (c)(1),
(2) Date: Jun. 22, 2016

(87) PCT Pub. No.: WO2015/096978
PCT Pub. Date: Jul. 2, 2015

(65) Prior Publication Data
US 2017/0006573 A1 Jan. 5, 2017

(30) Foreign Application Priority Data
Dec. 24, 2013 (WO) ................ PCT/EP2013/077976

(51) Int. Cl.
H04W 64/00 (2009.01)
G06K 19/02 (2006.01)
(Continued)

(52) U.S. Cl.
CPC .......... *H04W 64/00* (2013.01); *G06K 19/025* (2013.01); *G06K 19/06028* (2013.01);
(Continued)

(58) Field of Classification Search
CPC .... H04W 64/00; H04W 84/12; G06K 19/025; G06K 19/06028; G06K 19/07703; G06K 19/07749
See application file for complete search history.

(56) References Cited

U.S. PATENT DOCUMENTS 6,863,219 B1 3/2005 Jacobsen et al.
7,791,455 B1 9/2010 Maclean
(Continued)

FOREIGN PATENT DOCUMENTS

DE 102007039041 2/2009
WO 2008000764 1/2008
(Continued)

OTHER PUBLICATIONS

International Search Report and Written Opinion for International patent application No. PCT/EP2014/077019, dated Mar. 2, 2015.

*Primary Examiner* — Brandon Miller
(74) *Attorney, Agent, or Firm* — Steven M. Koehler; Westman, Champlin & Koehler, P.A.

(57) ABSTRACT

An electronic tag, e.g. for use as a tracker tag or combined tracker and data tag, with a cellular communication module is disclosed. The cellular communication module is configured to transmit an indication of a current geographical location to an external data server. The electronic tag can optionally receive tag data from an external tag reader and optionally comprises an output means configured to output the tag data. The tag's microprocessor is configured to switch off at least a transmitter part of the cellular communication module in response to first data contained in a Mode S signal of an aircraft transponder. Said transmitter part may be switched on again depending on data in signals from external source(s) as received in the tag.

28 Claims, 5 Drawing Sheets (51) Int. Cl.
    *G06K 19/06* (2006.01)
    *G06K 19/077* (2006.01)
    *H04W 84/12* (2009.01)

(52) U.S. Cl.
    CPC . *G06K 19/07703* (2013.01); *G06K 19/07749* (2013.01); *H04W 84/12* (2013.01)

(56) References Cited

U.S. PATENT DOCUMENTS

| | | |
|---|---|---|
| 7,845,569 B1 | 12/2010 | Warther |
| 2004/0044463 A1* | 3/2004 | Shen-Feng ........... G08G 5/0082 701/120 |
| 2007/0222587 A1 | 9/2007 | Crider |
| 2008/0088445 A1 | 4/2008 | Oas |
| 2010/0066072 A1 | 3/2010 | Kazuchika |
| 2010/0096444 A1 | 4/2010 | Cummings |
| 2013/0214909 A1 | 8/2013 | Meijers |
| 2013/0241712 A1* | 9/2013 | Motley, III ........ G06K 19/0717 340/10.51 |
| 2014/0088857 A1* | 3/2014 | Hollin, Jr. .............. G10D 3/163 701/120 |

FOREIGN PATENT DOCUMENTS

| | | |
|---|---|---|
| WO | 2011093780 | 8/2011 |
| WO | 2012152745 A1 | 11/2012 |
| WO | 2013039395 A1 | 3/2013 |

\* cited by examiner

ELECTRONIC TAG WITH CELLULAR COMMUNICATION MODULE

FIELD OF THE INVENTION

The present invention relates to electronic tags. More specifically the invention relates to electronic tags capable of reporting a current location for tracking and tracing purposes.

BACKGROUND

The discussion below is merely provided for general background information and is not intended to be used as an aid in determining the scope of the claimed subject matter.

Electronic tags may be used to track and trace objects by attaching such a tag to the object. Hereto the tag is typically fitted with location detection capabilities, e.g. using GPS or cellular localization. The tag may transmit the current location to an external server where the location information is stored and from where the current location (and possibly past locations) of the tag may be retrieved. A cellular communication module, such as a GPRS module, may be used for transmitting the location information to the server. Hereinafter such tags are also called "tracker tags".

Electronic tags may be capable of receiving data from external data sources. This tag data may be stored in the tag for later reference. Hereinafter such tags are also called "data tags". A data tag may be combined with a tracker tag to add tracking and tracing capabilities to the data tag.

An exemplary use case of data tags is in the field of bag tags. Bag tags, also known as baggage tags, baggage checks or luggage tickets, have traditionally been used by bus, train and airline companies to route passenger luggage that is checked in to the final destination. Prior to the 1990s, airline bag tags consisted of a paper tag attached with a string. The tag contained basic information that was written or printed on the paper tag, namely the airline/carrier name, flight number, a 5, 6 or 10 digit code and the name of the airport of arrival. These paper tags became obsolete as they offered little security and were easy to replicate.

Current bag tags typically include a barcode. These bag tags are printed using thermal or barcode printers that print on an adhesive paper stock. This printed strip is then attached to the luggage at check in. This allows for automated sorting of the bags to reduce the number of misrouted, misplaced or delayed bags. Automated sorting of baggage using laser scanner arrays, known as automatic tag readers, to read bar-coded bag tags is standard at major airports.

Around 1% of all baggage worldwide currently gets lost or mishandled each year. The cost to rectify this comes down to around € 100 per bag with a total cost to the industry of around $2.6 bn, plus the airline may lose passengers to another competitor airline. Most baggage sortation and processing systems at airports worldwide are based on visual bag tag data and 1D barcodes printed on paper bag tags. The barcode scanners have to be "in line of sight" in order to be able to "read" the 1D barcodes and get them on the right "track" for it to be loaded on the correct baggage carts or ULD (Unit Loading Device) and onto the correct aircraft. An important reason why baggage gets lost is that the barcode on the bag tag is badly readable, e.g. due to damage to thermal printer heads or tears or folds in the bag tag. As a remedy, data tags in the form of electronic bag tags are being developed that include the barcode, or a representation thereof, as machine readable data.

An electronic bag tag may use radio frequency identification (RFID) technology for outputting the tag data. Such tags are typically implemented as high frequency (HF) or ultra-high frequency (UHF) RFID tags. The electronic bag tag may be a printed (typically disposable) paper bag tag with an RFID tag inside or a permanent (typically non-disposable) RFID bag tag. Radio frequency (RF) readers may be used to read the tag data, e.g. including the barcode, from the RFID bag tag and optionally write the tag data to the RFID bag tag. RF readers are typically used at a baggage drop-off point and during baggage handling at the airport.

Other communication techniques may be used for provisioning the tag data to the electronic tag, such as NFC, Low Energy Bluetooth or a mobile communication technique, such as GSM, GPRS, UMTS, CDMA, CDMA-2000, or LTE.

Another example of an electronic bag tag uses an electronic display for outputting the tag data in the form of a barcode (and possibly other information) as an alternative to having this information printed. As with RFID bag tags, the electronic tags with electronic display may be provisioned with tag data via any known communication technique. As the barcode is visibly displayed, the barcode may be read using traditional reading equipment for reading printed barcodes.

When used onboard of an aircraft, tracker tags and combined data and tracker tags face the problem that the cellular communication module, or at least the transmitter part thereof, is to be switched off during take-off. This is regulated by e.g. airplane safety regulations. One solution could be to include a manual switch to turn off the tag's cellular communication module, but this does not guarantee that the cellular communication module will be switched off as it may be forgotten.

Relying on sensor circuitry to deactivate the communication tag is error-prone, since the sensed parameters are typically influenced by circumstances external to the aircraft. For example, the amplitude of the signal is dependent on the propagation path(s) of the signal, sound may originate from sources outside of the aircraft and pressure depends e.g. on the altitude of the airport.

An airplane mode wireless identity transmitter device may be placed in luggage and periodically transmit short-range broadcast messages with an identity. When within proximity, a proximity broadcast receiver may receive and relay the broadcast signal to a server to determine proximity of the devices related to the relayed message. The transmitter devices may activate/deactivate an operation mode for use in an aircraft in response to receiving disable and enable wireless signals from signaling transmitters. After receiving a disable signal, the wireless identity transmitter may not transmit wireless signals until receiving an enable signal. The signaling transmitter may be arranged within an aircraft and transmit a disable signal on the basis of sensor data received from e.g. an accelerometer or altimeter that senses that the aircraft is taking off or has taken off.

This solution however requires a dedicated signaling transmitter to be arranged within the air craft that in itself transmits wireless signals that may interfere with aircraft electronics. Such transmitters are required to be certified which is a cumbersome process. Furthermore, relying on sensing parameters as a trigger to transmit the disable signal is not a reliable approach for deactivation of the transmitter.

There is a need for an improved electronic tag, and in a particular tracker tag and a combined data and tracker tag, configured to turn off the tag's communication module, or at least the transmitter part thereof, in a less complex and more reliable manner wherein compliance with e.g. airplane safety regulations is ensured.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

A solution is proposed that enables electronic tags, and in particular tracker tags and combined data and tracker tags, to turn off the tag's cellular communication module, or at least the transmitter part thereof. Electronic tags may comprise two parts, e.g. a part attached to the outside of an object and a part stored inside the object. As a result the electronic tag may be used in environments where no cellular transmission is permitted. An example of such environment is in an airplane when the doors are closed, in accordance with airplane safety regulations. As a bonus effect battery consumption may be reduced by switching off the tag's cellular communication module, or at least the transmitter part thereof. The tag's cellular communication module may be used for provisioning data to the tag and/or transmitting location information to an external server for tracking and tracing purposes.

According to an aspect of the invention an electronic tag is proposed for exchanging tag data with an external tag reader. The electronic tag can comprise an output component configured to output the tag data. The electronic tag can further comprise a cellular communication module configured to transmit an indication of a current geographical location to a first external data server. The electronic tag can further comprise a microprocessor configured to switch off at least a transmitter part of the cellular communication module in response to first predefined data in a Mode S signal from an aircraft.

According to another aspect of the invention a method in an electronic tag is proposed for switching a transmitter part of a cellular communication module between an off-state and an on-state. The tag can be configured for exchanging tag data with an external tag reader. The cellular communication module can be configured to transmit an indication of a current geographical location to a first external data server. The method can comprise switching off at least the transmitter part of the cellular communication module in response to first predefined data in a Mode S signal from an aircraft.

The tag may have implemented a gain value to prevent receiving first predefined data from too many Mode S signals. Setting a gain reduces the range at which Mode S signals can be read and may therefore limit the number of Mode S signals to be analyzed.

The tag data is data stored or storable in a memory of the electronic tag and may be pre-stored or received from an external source. The tag data may be updateable via an external source. The tag data typically contains information that is meant to be output, e.g. via a display, via a wireless communication signal or audibly. Depending on its use case, the tag data may represent any information. The tag data contains for example information about the owner of the electronic tag. In another example, if the electronic tag is used as a bag tag, the tag data contains information such as a license plate number, the name of the airport of arrival, flight date, departure time, International Air Transport Association (IATA) airport code of the airport of arrival, the airline code and/or the flight number.

The indication of the current location may be obtained by the tag using any known technique. For example, GSM triangulation techniques may be used, current and/or neighboring cell information obtained with the cellular communication module may be used, an indication of a location obtained in the one or more signals may be used, a GPS module may be embedded in the tag for obtaining a current location, A WiFi module may be embedded in the tag for obtaining WiFi based location information, and etcetera.

The cellular communication module, also known as mobile communication module, is e.g. a GSM, GPRS, UMTS, CDMA, CDMA-2000 or LTE communication module. The cellular communication module is capable of data communication with the first external server. A current location of the tag may e.g. be transmitted to the first external server for tracking and/or tracing purposes. When the tag is onboard of an airplane, at least the transmitter part of the cellular communication module is to be switched off (i.e. in a state wherein there is no transmission and no transmission is possible). This is to avoid potential interference with onboard electronics of the airplane and preserve battery power during flight. The receiver part of the cellular communication module may remain switched on, but may also be switched off or partly switched off together with the transmitter part.

The switching off of the transmitter part of the cellular communication module is advantageously triggered by first data in the Mode S signal. As a result the transmitter part of the cellular communication module may be switched off reliably and in a more timely manner than would be the case when using tag internal sensors only. For example, if relying on an accelerometer in the tag to detect a taking off of the plane, the tag would only be switched off when the airplane has already maneuvered along the runways and is in the process of taking off. This would not be in compliance with e.g. European airplane safety regulations, which define that the transmitter of a cellular module is to be switched off when the doors of an airplane close before takeoff. The first data in the Mode S signal timely indicates to switch off the transmitter part of the cellular communication module in accordance with the airplane safety regulations. The Mode S transponder is an existing and certified transponder in an aircraft, thereby obviating the need to arrange additional transponders in or in the vicinity of the aircraft.

The electronic tag is typically powered by a battery, which may be embedded in the tag or detachably provided to the tag. Preferably the battery is of a rechargeable type. An additional advantage of switching off the transmitter part of the cellular communication module is that power usage may be reduced resulting in an extended battery life.

Information from other sources may be used for triggering switching off and/or switching on of the communication module, or at least the transmitter part thereof. It should be noted that these solutions to trigger switching on/off of the communication module may be used independently from the solution wherein the first data and/or second data of the Mode S signal determines switching on/off of the communication module.

In an embodiment the tag can comprise a clock module. The clock module may be set using GPS time stamps. The one or more signals can comprise time schedule data. The one or more external sources can comprise a second external data server. The cellular communication module can further be configured to receive the time schedule data. The microprocessor can be configured to switch off at least the transmitter part of the cellular communication module if a current time obtained from the clock module is within a first predefined amount of time from a departure time obtained from the time schedule data.

In another embodiment the one or more signals can comprise time schedule data. The one or more external sources can comprise a second external data server. The cellular communication module can further be configured to receive the time schedule data. The method can comprises switching off at least the transmitter part of the cellular communication module if a current time obtained from a clock module in the tag is within a first predefined amount of time from a departure time obtained from the time schedule data.

The second external server contains time schedule data, at least for the current flight. Complete time schedule data, including e.g. departure time and arrival time information, may be received in the tag, but it is also possible that e.g. only departure time information for the current flight is received. The tag may be configured to switch off the transmitter part of the cellular communication module when according to the time schedule the airplane is scheduled for departure or at a predefined amount of time prior to the scheduled departure to ensure that the transmitter part of the cellular communication module is switched off in time.

It is possible that the time schedule data includes a flight number (or another identifier of the current flight), which may be matched with a flight number obtained in a transponder signal from the airplane. This enables the time schedule information to include time schedule information from other flights.

In an embodiment the one or more signals can comprise neighboring cell information of a cellular network. The one or more external sources can comprise one or more base stations in the cellular network. The cellular communication module can further be configured to receive the neighboring cell information. The microprocessor can be configured to switch off at least the transmitter part of the cellular communication module if the neighboring cell information is unchanged for a second predefined amount of time. The microprocessor can be configured to switch on at least the transmitter part of the cellular communication module if the neighboring cell information changes in a third predefined amount of time.

In another embodiment the one or more signals can comprise neighboring cell information of a cellular network. The one or more external sources can comprise one or more base stations in the cellular network. The cellular communication module can further be configured to receive the neighboring cell information. The method can comprise switching off at least the transmitter part of the cellular communication module if the neighboring cell information is unchanged for a second predefined amount of time. The method can comprise switching on at least the transmitter part of the cellular communication module if the neighboring cell information changes in a third predefined amount of time.

In cellular networks a cell is a part of the network covered by a base station. The neighboring cell information is typically received and used by the cellular communication module to track which base stations are available to potentially connect to for mobile communication. The neighboring cell information is received in accordance with standardized methods and includes a list of cell-IDs of neighboring cells. It is possible that there are no neighboring cells, in which case the list is empty, or that the list contains only one cell-ID of one neighboring cell.

The order of cell-IDs in the list of neighboring cell-IDs may change due to changes in signal strengths from the respective base stations, without triggering a detection of a change in the neighboring cell information. Signal strength information is not relevant to the decision to switch on or off the transmitter part of the cellular communication module. The neighboring cell information is defined to be unchanged if the neighboring cell-IDs in the list of cell-IDs are unchanged, irrespectively of the order of the cell-IDs in the list.

While the tag is in range of a cellular network, the neighboring cells may change when the tag moves. For example, while the tag is transported to an airport or moved around on an airport the neighboring cell information may change.

If the transmitter part of the cellular communication module is on (i.e. in a state wherein transmission is possible) and the neighboring cell information stops changing for a predefined amount of time, the tag may be onboard the airplane. This information may be used as a trigger to switch off the transmitter part of the cellular communication module.

If the transmitter part of the cellular communication module is switched off and the neighboring cell information starts changing again during another predefined amount of time, it may be concluded that the tag has left the airplane and that the transmitter part of the cellular communication module may be switched on again. Switching on may be dependent on further conditions, such as that switching on is only allowed when following a period of flight mode during which a change of position has occurred (e.g. exceeding a distance or cell-ID threshold). Otherwise, the taxi of the aircraft to the runway may cause the transmitter part to switch on again.

In an embodiment the tag can further comprising a WiFi communication module. The one or more signals can comprise WiFi access point information of one or more WiFi networks. The one or more external sources can comprise one or more WiFi access points in the one or more WiFi networks. The microprocessor can be configured to switch off at least the transmitter part of the cellular communication module if the WiFi access point information is unchanged for a fourth predefined amount of time. The microprocessor can be configured to switch on at least the transmitter part of the cellular communication module if the WiFi access point information changes in a fifth predefined amount of time.

In another embodiment the one or more signals can comprise WiFi access point information of one or more WiFi networks. The one or more external sources can comprise one or more WiFi access points in the one or more Wifi networks. A WiFi communication module can be configured to receive the WiFi access point information. The method can comprise switching off at least the transmitter part of the cellular communication module if the WiFi access point information is unchanged for a fourth predefined amount of time. The method can comprise switching on at least the transmitter part of the cellular communication module if the WiFi access point information changes in a fifth predefined amount of time.

The WiFi access point information typically contains identification data by which an access point may be identified. Examples of WiFi access point information are a basic service set identifier (BSSID) and a service set identifier (SSID).

The WiFi access point information is typically received and used by the WiFi communication module to track which WiFi access points are available to potentially connect to for WiFi communication. The WiFi access point information is received in accordance with standardized methods and includes a list of WiFi access points within communication range. It is possible that there are no WiFi access points, in which case the list is empty, or that the list contains only one WiFi access point.

The order of WiFi access points in the list may change due to changes in signal strengths from the respective WiFi access points, without triggering a detection of a change in the WiFi access point information. Signal strength information is not relevant to the decision to switch on or off the transmitter part of the cellular communication module. The WiFi access point information is defined to be unchanged if the WiFi access points in the list of access points are unchanged, irrespectively of the order of the access points in the list.

The WiFi access points within range may change when the tag moves. For example, while the tag is transported to an airport or moved around on an airport the WiFi access point information may change.

If the transmitter part of the cellular communication module is on (i.e. in a state wherein transmission is possible) and the WiFi access point information stops changing for a predefined amount of time, the tag may be onboard the airplane. This information may be used as a trigger to switch off the transmitter part of the cellular communication module.

If the transmitter part of the cellular communication module is switched off and the WiFi access point information starts changing again during another predefined amount of time, it may be concluded that the tag has left the airplane and that the transmitter part of the cellular communication module may be switched on again. To ensure that the tag actually left the airplane, the latter WiFi access point information based decision to switch on the transmitter part again is preferably taken in combination with other triggers, such as a cessation of the transponder signal.

In an embodiment the microprocessor can further be configured to monitor an operational state of the tag and to switch off at least the transmitter part of the cellular communication module in dependence of the operational state.

If e.g. a malfunction in a hardware or software component is detected, the transmitter part of the cellular communication module may be switched off. In this case the transmitter part may be switched off even if the tag is not onboard an airplane as a safeguard for not being able to switch off the transmitter part in case the malfunction persists or increases.

In an embodiment the tag data can be exchangeable to the external tag reader as data displayed on a display of the tag or as RFID data transmittable to the external tag reader in an RFID signal.

The tag data can thus be presented visually on a display, enabling existing tag readers for reading paper tags to be used for reading the electronic tag. Tags can have a smaller form factor without a display, in which case the tag data may be presented as RFID data to an RFID reader. Tags with display screen may also have RFID functionality.

In an embodiment the cellular communication module can be configured to receive the tag data from a third external data server.

This enables the tag data to be received and/or updated remotely. By using the cellular communication module, the source of the tag data and the electronic tag need not be in close proximity.

In an embodiment the tag can be an electronic bag tag. The tag data can comprise an IATA license plate code.

This enables the electronic tag to be used on airports as a replacement for paper bag tags.

In one or more of the embodiments the first, second and third external server may be distinct servers at different locations, distinct servers at overlapping locations or one and the same server. The external servers may be virtual servers at one or more physical servers.

In one or more of the embodiments multiple triggers may be used to switch on or off the transmitter part of the cellular communication module. Multiple triggers refers to multiple types of predefined data. If multiple triggers are used, then typically all triggers must be received before the transmitter part is switched on or off. Examples of multiple triggers are data received from multiple external sources and a trigger from the operational state of the tag in combination with one or more signals from one or more external sources.

In one embodiment, the tag comprises a location sensor, e.g. a GPS location sensor, wherein the microprocessor is configured to select between at least one of a first aircraft mode and a second aircraft mode on the basis the sensed location. The first aircraft mode comprises switching off and/or on at least the transmitter part of the communication module in response to predefined data in a signal according to one or more of the triggers containing predefined data defined above. In the second aircraft mode switching off and/or on is performed in response to sensing parameter values in the tag, such as signal strength, acceleration, pressure etc. Since different regions apply different regulations as to when switching off of the transmitter must occur and/or when switching on of the transmitter allowed, the location sensor enables applying triggers in accordance with the current location of the aircraft.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments of the invention shown in the drawings, in which:

FIG. 7 shows an exemplary flow chart wherein the transmitter part of the cellular communication module is switched on.

DETAILED DESCRIPTION OF THE DRAWINGS

Electronic tags may have various use cases. A tracker tag may be attached to an object, such as a bag, a suitcase or keys, or simply put in the object in case of e.g. a bag or a suitcase. The object may then be tracked and traced. A data tag may contain information identifying a natural person or a legal entity. When applying the data tag to an object, such as a bag, a suitcase or keys, the information may be read from the tag to find the owner in case the object is e.g. lost. In another example the data tag contains flight related information. In this case the data tag may be used as a replacement of a paper bag tag used in baggage handling on an airport.

In a data tag the information is stored in a memory of the tag as tag data. The information may include textual information, images, binary data and/or any other digital information. The information may be stored in encoded form and/or in encrypted form.

The electronic tag contains an embedded cellular communication module. This module is used to communicate an indication of a current location to an external data server. This enables the tag to be tracked and/or traced remotely, e.g. via a website having access to the location information in the external data server. Furthermore, the tag may report its location from any location with cellular coverage. In a data tag the cellular communication module may also be used to receive the tag data from an external source, such as a server on the Internet.

When in use, the transmitter part of the cellular communication module is known to potentially cause electromagnetic interference (or EMI, also called radio-frequency interference or RFI) to electrical circuits. This is especially true when dealing with delicate or unshielded electrical circuits. In some environments, such as in aircrafts, safety regulations may be in place that prescribe that the transmitter part of cellular devices must be turned off as a precaution against interference with electronics in the aircraft. Different airplane safety regulations are in place around the world. For example, according to European airplane safety regulations the transmitter part of the cellular device is to be turned off when the doors of the airplane are closed while in the US the transmitter part is to be turned off when taking off. To comply with the strongest safety regulations, the electronic tag may be designed such that at least the transmitter part of the cellular communication module can be switched off reliably at the latest possible moment. To that end, the electronic tag contains a location sensor, e.g. a GPS sensor, to select a mode wherein the switching on/off part is controlled in accordance with regulations applying at the current position of the aircraft.

Figure 1:
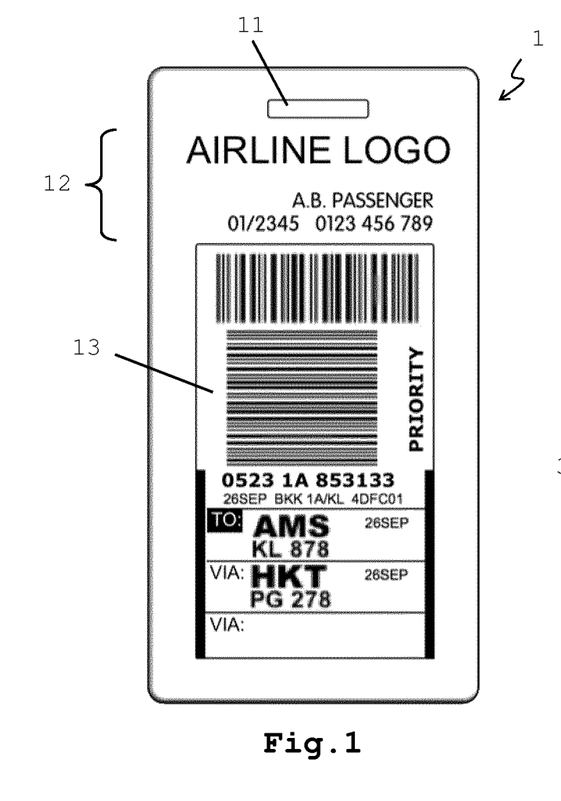
FIGS. 1-3 show different examples of electronic tags.
Figure 2:
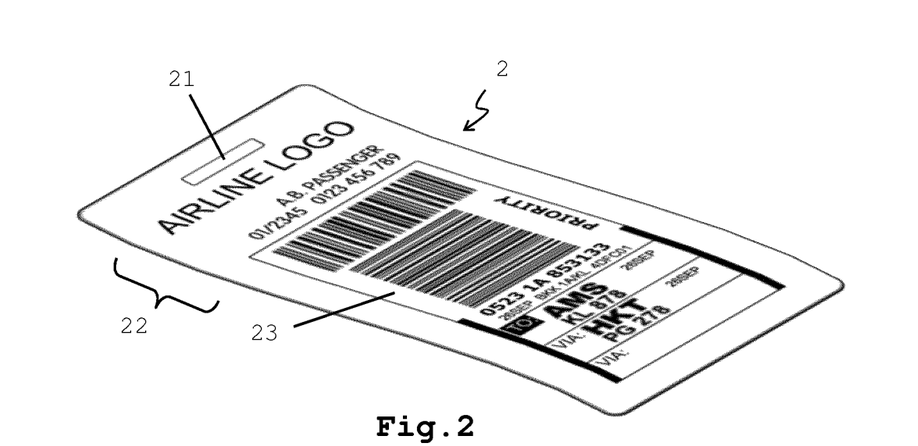
Figure 3:
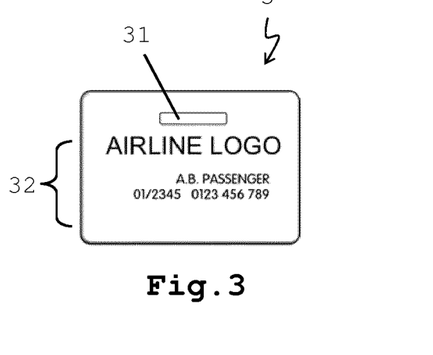

Data tags may come in different shapes and sizes. FIG. 1 and FIG. 2 show examples of data tags 1,2 having an electronic display 13,23. FIG. 3 shows an example of an electronic bag tag with integrated RFID tag. Miniaturized electronics in the bag tag may be embedded in a printed circuit board (PCB) layer. The data tag may be flexible such as shown in FIG. 2.

In FIGS. 1-3 data tags are shown as electronic bag tags for labeling airplane luggage as an example.

The electronic bag tags 1,2,3 contain a cellular communication module, such as a GSM, GPRS, UMTS (3G), LTE (4G) or a variant thereof, CDMA and/or CDMA-2000 communication module, for reporting a current location or an indication thereof to an external data server. The location information is typically stored on the external data server for tracking and tracing purposes.

The electronic bag tags 1,2,3 have wireless communication capabilities for uploading tag data to the tag and possibly for reading the tag data from the tag. Long range communication capabilities are integrated in the form of the cellular communication module.

The data tag, such as the electronic bag tag, may have one or more displays. With e.g. two displays, one on the front side and one on the rear side of the tag, the content displayed on the displays may differ. It is possible that the same content is displayed on both displays. Different data layouts may be applied using templates stored in or sent to the tag.

In an exemplary embodiment (not shown) the data tag may be communicatively connected, possibly wirelessly, to a separate display unit with one or more displays for displaying the tag data.

With electronic bag tags the display 13,23 is typically used for displaying variable information such as a license plate number, the name of the airport of arrival, flight date, departure time, International Air Transport Association (IATA) airport code of the airport of arrival, the airline code and/or the flight number. With the RFID tag 3 this information may be read from the tag using an RFID reader.

The term license plate is the official term used by the IATA, the airlines, and the airports for the 10-digit numeric code on a bag tag issued by a carrier or handling agent at check-in. The license plate is typically displayed on the carrier tag in bar code form and in human-readable form, as defined in Resolution 740 in the IATA Passenger Services Conference Resolutions Manual (published annually by IATA). Each digit in the license plate has a specific meaning. The license plate is an index number linking a bag to a Baggage Sortation Message (BSM) sent by a carrier's departure control system to an airport's baggage handling system. This message contains flight details and passenger information, thus enabling an automated baggage handling system to sort a bag automatically once it has scanned the bar code on the carrier tag. Bag tags may also contain the name of the passenger identified with the baggage (last name, first name).

An information area 12,22,32 may be used to print non-variable information, such as the name of the passenger (i.e. the owner of the electronic bag tag), a barcode with the name of the passenger, an identification code of the electronic bag tag encoded therein, advertorial information e.g. in the form of an airline logo, and etcetera. Alternatively or additionally this non-variable information may be displayed on the display 13,23 or stored in the RFID memory of the tag 3.

The electronic tag 1,2,3 may have one or more punched or drilled holes 11,21,31 for attaching a strap or any other means for application to an object such as a piece of luggage.

The data tag may be used for other kind of tag data, possibly unrelated to air transportation.

Figure 4:
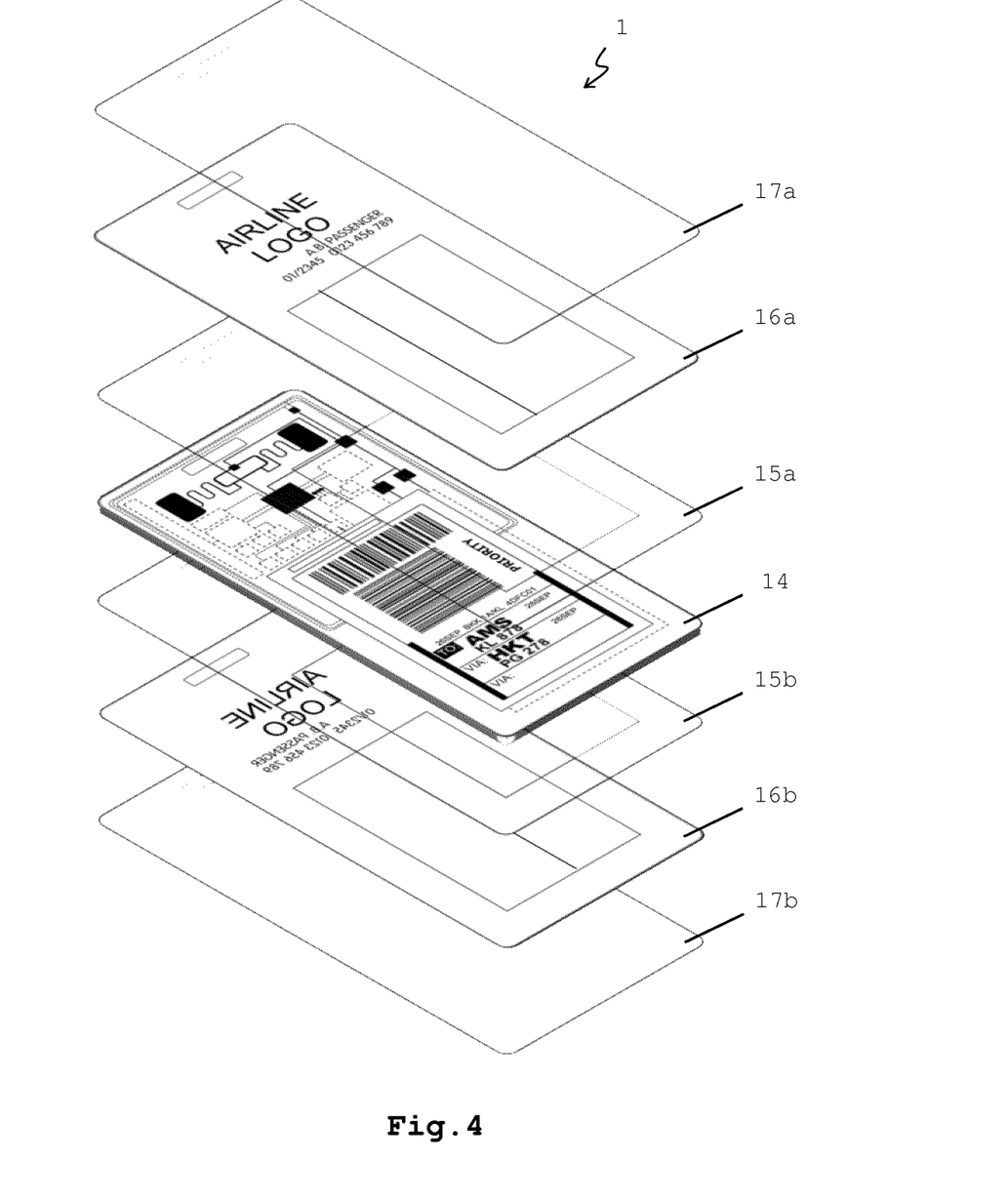
FIG. 4 shows an exemplary layered view of an electronic tag.

FIG. 4 shows an example of a layered build-up of a dual display electronic tag, such as shown in FIG. 1. A first layer 17*a* on the first side of the electronic tag may be a laminated or glued transparent polymer based film. A second layer 16*a* on the first side of the electronic tag may be a laminated pre-printed PVC substrate (or other polymer like polycarbonate (PC), polyphenyl delta-butylene (PdB) or polyester, and etcetera) which may come in any kind of color combination and contain preprinted graphics, logo's, printed barcode, passenger name, credentials and/or other types of branding. A third layer 15*a* on the first side of the electronic tag may be a MS polymer or polyurethane layer or similar compound.

A printed circuit board (PCB) layer 14 preferably has a highly adaptive architecture including electronic components. The displays, which may be a part of the printed circuit board layer 14, may have a glass backplane or flexible backplane. The displays may further have a special hardened glass top layer glued on top of the front-plane. The displays may have a flexible front- and backplane. For the printed electronics conductive copper, silver ink and/or conductive polymers may be used. A thin film PCB may be made with an electronic circuitry using flexible conductive copper in combination with highly miniaturized integrated chips (integrated circuits) such that it will not jeopardize the flexible integrity of the thin film PCB in case of a flexible electronic bag tag, such as shown in FIG. 2. A rechargeable battery may be embedded in the PCB layer or a placeholder for placing a battery may be part of the PCB layer. In the latter case the layers 15a, 16a and 17a (or 15b, 16b and 17b, depending on the location of the battery placeholder) are suitably adapted to allow the battery to be placed in the placeholder.

The layers 15a, 16a and 17a on the first side of the electronic tag may have equivalent layers 15b, 16b and 17b, respectively, on the second side of the electronic tag.

It is to be understood that the invention is not limited to the exemplary design shown in FIG. 4. For example, dimensions may differ, the layered structure may be implemented differently, and etcetera.

Figure 5:
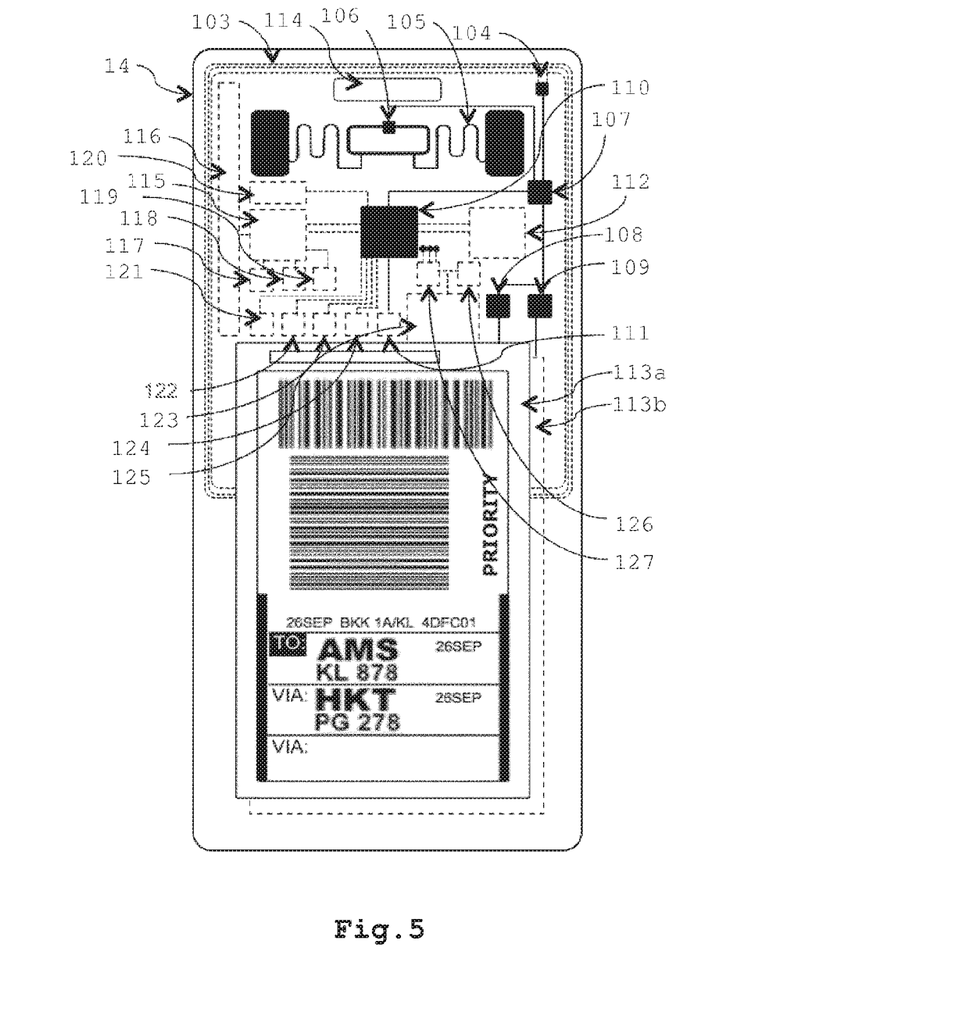
FIG. 5 schematically shows the electronics in an exemplary tag.

FIG. 5 shows a more detailed view of an exemplary PCB layer 14 having two displays. The width and height of the PCB layer 14 may be similar to a standard debit/credit card compliant with ISO/IEC 7810 ID-1. Depending on industry and/or customer requirements these dimensions may be chosen differently. ISO/IEC 7810 ID-1 form factor dimensions are approximately 85.70 mm×54 mm×2.3 mm (height×width×thickness). The thickness of the PCB layer 14 should be sufficient to accommodate a battery.

The PCB layer 14 as shown in FIG. 5 may contain components that do and do not require a local power supply. For example RFID components may be powered by an external electromagnetic field and may not require a local power supply. One or more of the following components may be embedded in the PCB layer 14: RFID HF antenna 103; integrated circuit with HF 13.56 MHz ISO 14443 and/or ISO 15693 support 104; RFID UHF antenna 105; integrated circuit with UHF 860-960 MHz EPC Gen2 integrated circuit ISO 18000-6C support 106; main power management module 107; power management module 108 for the display; battery controller 109; microprocessor 110; security controller integrated circuit 111; an automatic dependent surveillance-broadcast (ADS-B) receiver 112; first display 113a with integrated display driver integrated circuit; second display 113b with integrated display driver integrated circuit; cellular (e.g. GSM/GPRS multi band) modem integrated circuit 115 (also called the cellular communication module); GSM/GRPS/GPS antenna 116; SIM chip or E-SIM 117; speaker 118; V motor 119; LED light 120; button 121 for manually switching on/off transmitting and or receiving functions, such as cellular communication and GPS; digital and/or analog I/O 122,123 for relays, volatile or non-volatile memory 124; power supply 125 in the form of a thin flexible battery, such as a lithium ion rechargeable battery; a power management system 126; and a power management system 127 feeding the microprocessor and other electronics with e.g. 5V, 3.3V or 1.8V.

The ADS-B receiver may be used for receiving transponder signals, such as Mode S signals from aircrafts. The tag may have implemented a gain value to prevent receiving first predefined data from too many Mode S signals. Setting a gain may limit the number of Mode S signals to be analyzed. The optional RFID UHF antenna preferably has a high readability and orientation insensitivity due to symmetry by design. The RFID UHF IC protocol may conform to EPC Class 1 Gen 2, which supports contactless interfaces conform ISO 18000-6C (869 MHz), FCC (915 MHz) and ETSI (865 MHz).

Parts of the electronic tag may be activated by proximity to an active RFID reader. When the electronic tag enters a reader's RF field, the power management converts the induced electromagnetic field to the DC voltage that powers the microprocessor, which may include the integrated dual display controller.

In case the microprocessor is integrated with a display controller, dual display controller or multiple separate display controllers, the integrated circuit is typically able to run multiple applications and execute command sequences and overhead duties. The integrated display controller(s) is/are used for driving the one or more displays.

The microprocessor may run a proprietary operating system based on open platform technology such as Java, C or C++, proprietary firmware including driver software for driving displays and other components, proprietary security software and/or proprietary software applications.

The security controller may be used for secure private data storage and/or secure data display. The security controller optionally supports proprietary security algorithms.

In case of a dual display tag, the displays may be dual flexible active matrix displays with the following characteristics. The front and rear display size may be 2.7 inch diagonally, but may be larger or smaller. In the front plane a polymer substrate with E-ink technology may be used. In the back plane a sheet of glass with active matrix array may be used, however a polymer substrate with Active-Matrix array using EPLaR or any other technology may alternatively be used making the display flexible. The total thickness of each display may be approximately 1 mm. In case a flexible display is used, the flexibility or bending radius may be 20 mm or larger. The resolution may be approximately 200 DPI. The display may have a wide viewing angle. The gray scale levels may be 1 bit or 4 bit. Low cost manufacturing of bi-stable flexible displays may be achieved using existing high yielding LCD factory and EPLaR technology. The display ultimately has a low power consumption and may have an input voltage of approximately 3 volts. The display may comprise flexible connectors.

The memory 124 may be used for storing the tag data and possibly other data and/or computer code.

The system design of the electronic bag tag allows adding additional components such as but not limited to: button(s) for navigation purposes, memory other card/tag controller such as Smart MX, Desfire, a GPS receiver, and etcetera.

A hole 114 may be punched or drilled in the PCB layer 14 to enable attaching a strap to the electronic tag for attaching the electronic tag to an object, such as a piece of luggage.

The microprocessor 110 may contain a proprietary operating system (OS) and a proprietary software application embedded in the OS layer. The embedded software application receives, converts and processes tag data and stores the tag data and/or processed tag data in the designated non-volatile memory. The processed tag data may be formatted such that it can be presented, possibly together with a pre-loaded template, on the display(s) or output as an RFID signal. The OS may contain the possibility to "post-load" software applications, e.g. by downloading binary code via the cellular communication module. Other forms of communication, e.g. Bluetooth Low Energy (BLE), may also be used to pass data to the tag.

In case of using the electronic tag as a bag tag, the tag data may be received from a data server of a back-end system. A method may be used whereby a part of the tag data, the so-called "license plate" number, is converted on the tag using an IATA specified barcode font for 1D barcodes so that no barcode images have to be transmitted to the tag. This reduces the amount of data that is to be transmitted to and processed in the tag. The tag data from the airline back-end system may be sent in ASCII format or any other format and wirelessly transferred to the tag, e.g. via RFID signals or via the cellular communication module or via BLE.

Parts of the electronic tag may be implemented as a passive tag, thus without requiring a local power supply. Highly energy efficient displays may e.g. be used that only require power when displayed information is to be refreshed and do not need power to maintain information on the display. Examples of such displays are bi-stable electrophoretic displays from for example Eink and Sipix.

Parts of the electronic bag tag may require a local power supply, e.g. to support one or more wireless communication components such as DASH7, Bluetooth (Low Energy), GSM/GRPS including an E-SIM (SIM on a chip), GPS or GNSS hybrid, and etcetera, for the purpose of wireless receipt of bag tag data over a longer range and provide location information to an external data server for tracking and/or tracing purposes.

In an exemplary embodiment, different tag functions may be distinguished: wireless receipt of tag data (function 1); processing and storage of the tag data (function 2); outputting e.g. visually via a display, via an RFID signal or audibly of the tag data (function 3); and transmitting location information to an external data server for tracking & tracing purposes (function 4). While functions 1-3 are optional, the fourth function is mandatory.

Re function 1 and function 4, the electronic tag may wirelessly receive tag data using HF or UHF RFID frequency bands. The data received may also change the data displayed on the screen(s) such that the received and displayed data are always in sync. The 13.56 MHz (HF) band may be used with an ISO/IEC 14443 interface (this includes Near Field Communication/NFC) and/or an ISO/IEC 15693 interface. The 860/960 MHz (UHF) band may be used in accordance with ISO/IEC 18000-6C, EPC Gen2 for electronic tags with e.g. segmented electrophoretic displays. UHF is globally used in several airports and recommend by IATA.

Re function 1 and function 4, the electronic tag may be made to wirelessly receive the tag data using the 433 MHz UHF frequency band in accordance with ISO/IEC 18000-7, also known as DASH7.

Re function 1 and function 4, the electronic tag may be made to wirelessly receive the tag data using alternative frequency bands, such as the 2450 MHz and 5800 MHz band for 802.11 WLAN, Bluetooth or Zigbee.

Re function 1 and function 4, the electronic tag may be made to wirelessly receive tag data using cellular networks. GSM/GPRS, UMTS or any other mobile communication technique may be used for retrieving the tag data from a data server of a back-end system.

Re function 2, the tag is typically operated by an (possibly proprietary) operating system installed on the embedded microprocessor (possibly in conjunction with a non-volatile memory) and by a proprietary application embedded in the OS layer for outputting and possibly converting the tag data into e.g. IATA specified barcode font(s).

Re function 3, the (possibly processed) tag data is pushed towards the displays and to display information. In electronic bag tags the displayed information is preferably compliant with IATA specifications for baggage labels as described in IATA's Baggage Services Manual. In accordance with the same IATA specifications the electronic bag tag is preferably able to function as what is known as a "Schengen" baggage label. To achieve this, each display may have a solid black bar with e.g. "EU" repeated in inverted printing throughout the length of the bar.

Re function 1 and function 3, in business critical operational environments such as airport check-in and baggage check-in, operational efficiencies may be gained when devices carried by passengers are non-reliant on batteries. The electronic tag is therefore preferably energy efficient and operable without using the local power supply (battery) while maintaining information on the display(s). The electronic tag's power management module may ensure that power derived by the electronic tag's embedded RFID HF interface from the RF field of an external RFID HF device, which is usually around 5V, is regulated to the supply voltage required by the tag's microprocessor and the integrated display(s) such that the microprocessor can receive and process tag data and present this data on the display(s). Alternatively it is possibly not to rely on the external power source (i.e. from the external RF field) and use the internal battery for powering the electronics.

With electronic bag tags, the GSM/GPRS, the UMTS or any other cellular communication capabilities may be used to enable baggage check-in at home (or wherever there is GSM coverage) and receive the relevant flight information in the tag, to give the airline the ability to remotely access the tag to e.g. re-route baggage by sending new tag data to the tag, and enables global tracking & tracing of the tag indoors and outdoors.

The electronic tag may be used in the following exemplary showcase. A passenger performs an off-airport passenger and baggage check-in from any Internet enabled desktop computer, laptop, tablet or mobile device. The Passenger Name Record (PNR) is retrieved from the back-end system. The passenger checks-in, his seat is assigned, and the number of hold luggage is confirmed or updated. The passenger boarding pass is provided and passenger's tag data is wirelessly sent from the back-end system to the electronic tag via the tag's cellular communication interface. The tag data is retrieved by, processed and displayed on a display of the electronic tag. The passenger proceeds to the airport and towards the dedicated baggage drop-off counter with the electronic tag fitted on the luggage. The passenger is identified, hold luggage is put on the belt/scale and tag data is read wirelessly from the tag via the RFID HF interface or visually scanned from the display. The baggage is weighed and the PNR record is updated. At this point, the electronic tag may get activated. The tag data in the tag may be updated to include the weight information. The passenger's baggage, including the tag, is sent off to the baggage sortation systems for processing toward the correct airplane on the platform. The passenger proceeds to the security check and gate. The passenger's baggage is being processed, the electronic tag is being scanned and/or tracked in the airport's baggage systems by reading the 1D barcodes from the tag's displays and/or by reading the tag's RFID UHF and/or by locating the bag via location information transmitted via the GSM/GPRS module. When the baggage is loaded on the airplane, first data contained in the Mode S signal of the air plane instructs the tag to switch off at least the transmitter part of the cellular communication module to comply with the airplane safety regulations.

To ensure that the transmitter part of the cellular communication module is securely switched off, multiple data triggers may be used. Examples hereof are GSM base station cell id information, real time flight information, a data from the Mode S transducer signal on board the aircraft, such as Mode S status data.

Figure 6:
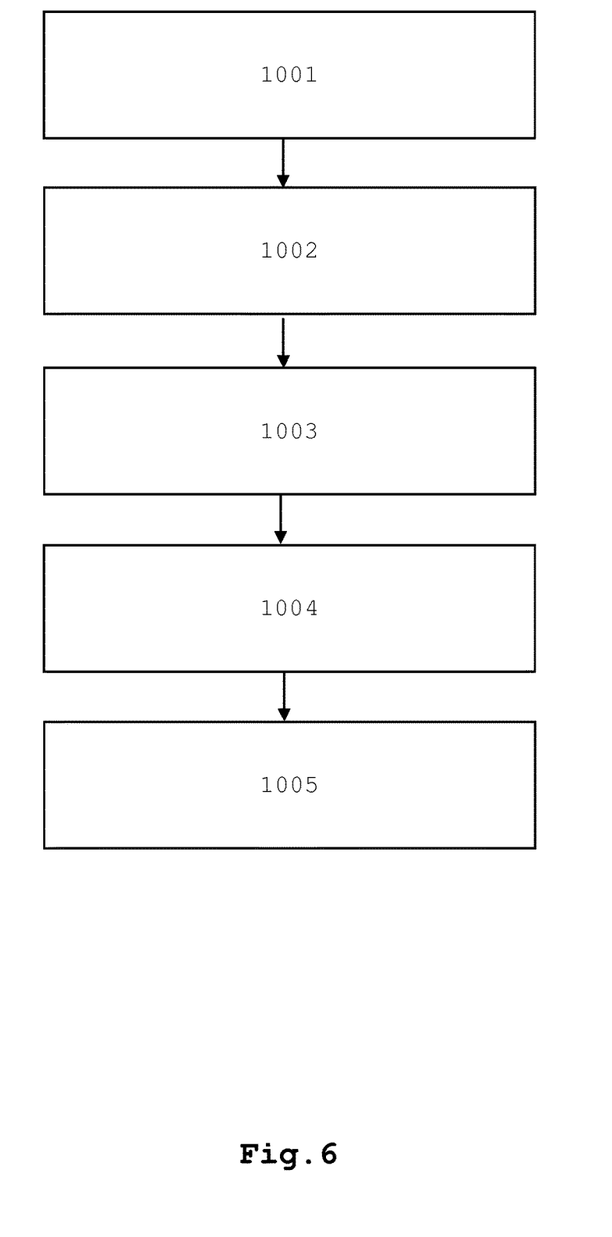
FIG. 6 shows an exemplary flow chart wherein the transmitter part of the cellular communication module is switched off.

FIG. 6 shows an exemplary flow chart of a logic that results in turning off the transmitter part of the cellular communication module in the electronic tag. In step 1001 a passenger handling system checks bags in on-line. The bags each have electronic tags attached. At this stage the transmission part of the cellular communication module may be on or turned on, i.e. in a state wherein transmission is possible. In step 1002 tag data is transmitted to the electronic tag and received via the cellular communication module. The tag data may include flight information, possibly of all legs of the booked flight. The flight information typically includes departure times of the airplane(s) at the one or more airports to the destination. In step 1003 the tag is validated at the baggage drop on the airport. At this point the transmitter part of the cellular communication module may be turned on, if not already, to enable tracking of the tag on the airport. In step 1004 the Mode S transponder signal of the aircraft may be monitored using an automatic dependent surveillance-broadcast (ADS-B) receiver in the tag. In accordance with first data in the Mode S signal read by the microprocessor, switching off the cellular transmitter is performed. The first data may comprise the Mode S status.

During the flight the Mode S signal may be monitored to determine the aircrafts Mode S signal ID, as indicated by step 1005.

Figure 7:
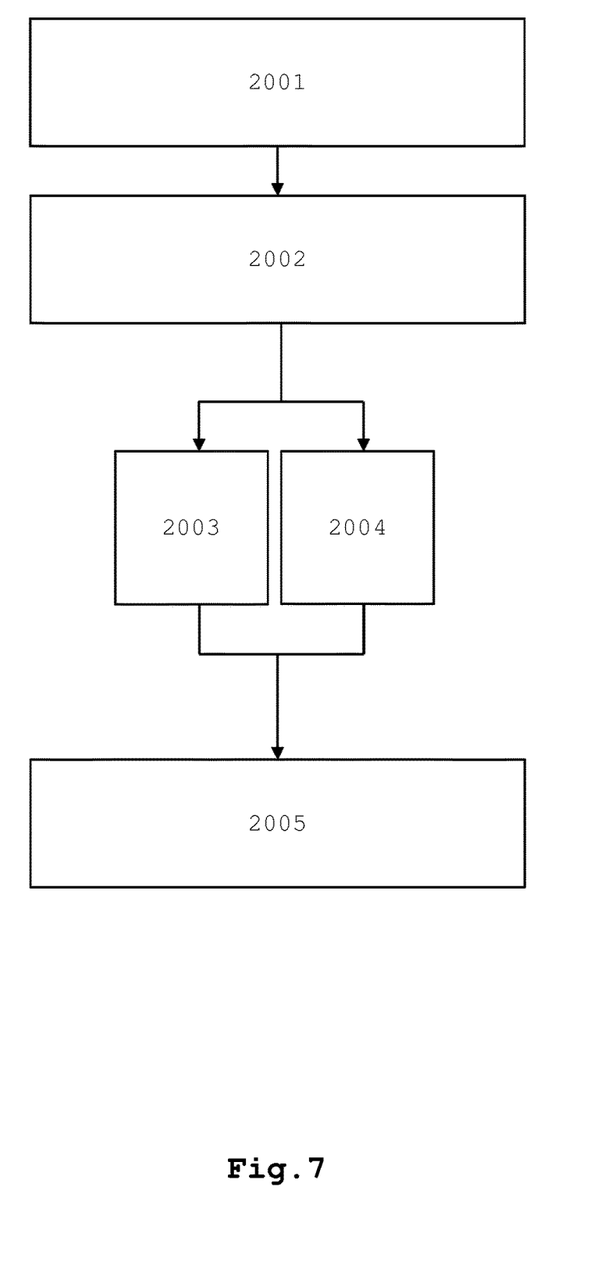

FIG. 7 shows an exemplary flow chart of a logic that results in turning on the transmitter part of the cellular communication module in the tag. In step 2001 the receiver part of the cellular communication module may be used to periodically monitor neighboring cells. When the airplane descends, typically base stations defining the cells of a cellular network become visible and neighboring cell information starts appearing and changing. This may be used as a trigger to start monitoring other signals, such as the data contained in the transponder signal. In step 2002 an increase in neighboring cell changes may be detected and the cells-ids of the cells may be recorded. Steps 2003-2007 are different triggers that may result in turning on the cellular transmitter.

In step 2003 the Mode S signal may be read. If the Mode S status indicates that the plane is on the ground, this may trigger the cellular transmitter to be turned on. As a precaution the cellular transmitter may be switched on after a predefined amount of time, e.g. 5 minutes.

In step 2004 the neighboring cell information is used to determine if the neighboring cell information remains unchanged for a predefined amount of time, e.g. during 5 minutes. If the neighboring cell information stops changing, this is an indication that the airplane stopped at the gate.

This may be used as a trigger to switch on the cellular transmitter.

In step 2005, the transmitter is switched on if both steps 2003 and 2004 are positive. It should be noted that steps 2003 and 2004 may also be applied individually for the microprocessor to determine that the transmitter may be switched on.

Similar to the use of the neighboring cell information, WiFi access point information may be used. WiFi access point information may be used alternatively or additionally to the neighboring cell information.

WiFi networks are accessible via a WiFi access point. A WiFi communication module in the tag may scan for WiFi access points within communication range. A list of access points within range is typically stored in the tag when the WiFi communication module is active. Similar to the neighboring cell information, the WiFi access point information may contain data identifying one or more WiFi access points. Examples of such data are a BSSID and an SSID.

In WiFi networks a single access point (AP) together with all associated stations are typically called a basic service set (BSS). The access point acts as a master to control the stations within that BSS; the simplest BSS consists of one access point and one station. Each BSS is uniquely identified by a basic service set identification (BSSID). The BSSID is e.g. the MAC address of the wireless access point generated by combining a 24 bit Organization Unique Identifier (the manufacturer's identity) and the manufacturer's assigned 24-bit identifier for the radio chipset in the wireless access point. The BSSID is the formal name of the BSS and is typically associated with one BSS. The SSID is an informal and typically configurable name of the BSS. The BSSID and/or SSID are typically broadcast by the access points.

The Mode S messages transmitted by the aircraft's transponder are typically 56 bit or 112 bit long and starts with a data byte indicating the type of message (e.g. "upload" for messages destined for an aircraft and "download" for those from an aircraft) and the capabilities of the transmitter. Some Mode S messages may be broadcast without prompting by message reception. Non-prompted status messages are known as squitters. They are broadcast to indicate that the aircraft is in the area and its intentions. The electronic tag typically listens to these squitters when monitoring the Mode S signal.

Before the flight, at the airport, squitters from several aircrafts may be received. As the flight progresses and the aircraft gets into clear airspace, typically only squitters form 'our' aircraft are received. Once the ID being transmitted from our aircraft is determined from the Mode S signals, the tag may stop looking at the Mode S messages until the aircraft lands. This reduces battery usage, increasing battery life.

GSM base stations (i.e. neighboring cells) may be monitored during the flight. These will start to become visible as the aircraft gets low on it final approach. While the aircraft is still moving the list of available base stations will be changing. When the aircraft is stationary at the gate then the list with neighboring cell-ids typically settles down to a limited number of cells, e.g. three to six base stations. At this stage the squitters may be monitored again. The Mode S is typically switched off when the aircraft is parked and engines are off, just before the doors are opened.

An example extended squitter may contain the following data: 8C484061401005225FDBB03879552. This message is 112 bits in length and is coded in a Download Format 17. It is an extended squitter message. In this example the following information is encoded (the code, its binary equivalent and its meaning are given).

8C->10001100->Download format (DF) 17 (first 5 bits)
CA: 4—Mode-A and Mode-B capable.

484601->24 bit Address—this is the unique aircraft address.

40100525FDBB03->Extended message contents—56 bits—this contains aircraft status data and can vary between ADS-B messages. The first 5 bits of this indicate the type of data contained. In this case they are 01000->8 which is a ground position message.

879552->Parity Information—basically a checksum for the entire message. We don't need to cover this.

Another example is the following squitter: 8D484061990001002280786B2FA9E. This message, starting from 484061, has a message content that is of type DF19 meaning that it is an airborne velocity message.

A DF18 message would be used by devices that are not Mode-S transponders although they may transmit Mode-S type data, e.g.: 904842F633ECE52589BB17776F2D. This message has the following contents:

90->10010000->DF18 CF0—means that AA field contains ADS-B style ICAO address and message contents.

4842F6—24 bit address.

33ECE52589BB17—message contents—first 5 bits are 00110->6 which indicates that the contents are a type of surface message.

A "standard squitter" is 56 bits long, e.g. 5D484061018383. This message has an address of 484601, similar to the DF17 extended squitter type message above.

The 24 bit address from the ADS-B messages may be captured, e.g. from broadcast (download) messages (112 bit DF17 messages) and 56 bit squitter messages. These addresses may be stored in the tag with e.g. the following data elements. In this table "det." is an abbreviation of "detection", Airborne indicates whether the aircraft is airborne, and Count indicated how often the address is captured.

| Address | 1$^{st}$ det. time | Last det. time | Airborne | Count |
|---|---|---|---|---|
| 345678 | 12:15:34 | 12:56:34 | Yes | 24 |
| 214365 | 12:49:21 | 12:55:21 | No | 6 |
| 456789 | 12:24:38 | 12:56:38 | Yes | 9 |
| 213456 | 12:05:09 | 12:34:09 | Yes | 4 |

ADS-B addresses may be monitored over a period of time. The address that has been detected for the longest period and is still being detected is assumed to be the address of the aircraft on which the tag has been placed. Each time an address is detected its count may be incremented and the time of its last detection is updated. A message that has a type field indicating that it contains airborne data, may increase the count by more than a message that contains ground based information. The address with the highest count is the current favorite for belonging to the aircraft that the tag is on. In the event of more than one entry having the highest count, then the one that was first detected may be taken as the favorite. Once the difference between the last time that an address was detected and the time now exceeds a threshold then it may be removed from the table.

If a transition from airborne to ground type message is read for the favorite address, then it may be locked as being the aircraft that the tag is on and once the last time that it was read is detected times out the GSM is enabled.

The electronic bag tag may include (MEMS) sensors such as a three axis accelerometer, three axis magnetic sensor, single dual or three axis gyroscope, pressure sensor including altitude etc. Such sensors may be used to implement a second aircraft mode. Connection with external MEMS devices may be made via BLE, enabling monitoring of cargo at many points around the hold.

The second mode may be used in addition to or as an alternative to the first aircraft mode, wherein predefined data from the Mode S signal, the cell information etc. is used. In the second aircraft mode, the sensing data from sensors internal to the tag may be used by the microprocessor to determine switch off/switch on of the transmitter.

Selection of the first aircraft mode or the second aircraft mode may be made in accordance with GPS coordinates (or more generally: location information) read by the tag. In this manner, determination of when to switch on/off the transmitter part of the communication module can be closely tailored to regulations governing the current position of the aircraft One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. An electronic tag comprising:
   a cellular communication module configured to transmit an indication of a current geographical location to a first external data server;
   an automatic dependent surveillance-broadcast (ADS-B) receiver configured to receive a Mode S signal from an aircraft; and
   a microprocessor operably coupled to the cellular communication module and the reciever and configured to switch off at least a transmitter part of the cellular communication module in response to first predefined data in the Mode S signal.

2. The tag according to claim 1, wherein the microprocessor is further configured to
   switch on at least the transmitter part of the cellular communication module in response to second predefined data in the Mode S signal.

3. The tag according to claim 2, wherein the first predefined data is indicative of the aircraft taking off or flying, and wherein the second predefined data is indicative of the aircraft having landed or being on the ground.

4. The tag according to claim 1 wherein the communication module is configured to exchange tag data with an external tag reader, further comprising a memory operably coupled to the microprocessor for storing the tag data and an output means configured to output the tag data.

5. The tag according to claim 4, wherein the tag data is exchangeable to the external tag reader as data displayed on a display of the tag or as RFID data transmittable to the external tag reader in an RFID signal.

6. The tag according to claim 4, wherein the cellular communication module is configured to receive the tag data from a third external data server.

7. The tag according to claim 4, wherein the tag is an electronic bag tag and the tag data comprises an IATA license plate code.

8. The tag according to claim 1, further comprising a clock module, wherein one or more signals comprise time schedule data, wherein one or more external sources comprise a second external data server, wherein the cellular communication module is further configured to receive the time schedule data, and wherein the microprocessor is configured to:
   switch off at least the transmitter part of the cellular communication module if a current time obtained from the clock module is within a first predefined amount of time from a departure time obtained from the time schedule data.

9. The tag according to claim 1, wherein one or more signals comprises neighboring cell information of a cellular network, wherein one or more external sources comprises one or more base stations in the cellular network, wherein the cellular communication module is further configured to receive the neighboring cell information, and wherein the microprocessor is configured to:
switch off at least the transmitter part of the cellular communication module if the neighboring cell information is unchanged for a second predefined amount of time.

10. The tag according to claim 9 and wherein the microprocessor is configured to:
switch on at least the transmitter part of the cellular communication module if the neighboring cell information changes in a third predefined amount of time.

11. The tag according to claim 1, further comprising a WiFi communication module, wherein one or more signals comprises WiFi access point information of one or more WiFi networks, wherein one or more external sources comprises one or more WiFi access points in the one or more WiFi networks, and wherein the microprocessor is configured to:
switch off at least the transmitter part of the cellular communication module if the WiFi access point information is unchanged for a fourth predefined amount of time.

12. The tag according to claim 11 and wherein the microprocessor is configured to:
switch on at least the transmitter part of the cellular communication module if the WiFi access point information changes in a fifth predefined amount of time.

13. The tag according to claim 1, wherein the microprocessor is further configured to monitor an operational state of the tag and to switch off at least the transmitter part of the cellular communication module in dependence of the operational state.

14. The tag according to claim 1 wherein the tag comprises a location sensor, wherein the microprocessor is configured to select between at least one of a first aircraft mode and a second aircraft mode based on a sensed location from the location sensor, and wherein the first aircraft mode comprises switching off and/or on at least the transmitter part of the communication module in response to first predefined data in the Mode S signal and the second aircraft mode comprises switching off and/or on in response to sensing parameter values in the tag.

15. The tag according to claim 1, further comprising a WiFi communication module, wherein one or more signals comprises WiFi access point information of one or more WiFi networks, wherein one or more external sources comprises one or more WiFi access points in the one or more WiFi networks, and wherein the microprocessor is configured to:
switch on at least the transmitter part of the cellular communication module if the WiFi access point information changes in a fourth predefined amount of time.

16. The tag according to claim 1, wherein one or more signals comprises neighboring cell information of a cellular network, wherein one or more external sources comprises one or more base stations in the cellular network, wherein the cellular communication module is further configured to receive the neighboring cell information, and wherein the microprocessor is configured to:
switch on at least the transmitter part of the cellular communication module if the neighboring cell information changes in a second predefined amount of time.

17. A method in an electronic tag comprising a cellular communication module having a transmitter part switchable between an off-state and an on-state, wherein the cellular communication module is configured to transmit an indication of a current geographical location to a first external data server, the method comprising:
recieving a Mode S signal from an aircraft in the electronic tag; and
switching off at least the transmitter part of the cellular communication module using a microprocessor in response to first predefined data in the Mode S signal from the aircraft.

18. The method according to claim 17, further comprising switching on at least the transmitter part of the cellular communication module in response to second predefined data in the Mode S signal from the aircraft.

19. The method according to claim 18, wherein the first predefined data is indicative of the aircraft taking off or flying, and wherein the second predefined data is indicative of the aircraft having landed or being on the ground.

20. The method according to claim 17, wherein the tag further comprises a memory for storing tag data, the method further comprising exchanging the tag data with an external tag reader.

21. The method according to claim 17, wherein one or more signals comprise time schedule data, wherein one or more external sources comprise a second external data server, wherein the cellular communication module is further configured to receive the time schedule data, and wherein the method comprises:
switching off at least the transmitter part of the cellular communication module if a current time obtained from a clock module in the tag is within a first predefined amount of time from a departure time obtained from the time schedule data.

22. The method according to claim 17, wherein one or more signals comprises neighboring cell information of a cellular network, wherein one or more external sources comprises one or more base stations in the cellular network, wherein the cellular communication module is further configured to receive the neighboring cell information, and wherein the method comprises:
switching off at least the transmitter part of the cellular communication module if the neighboring cell information is unchanged for a second predefined amount of time.

23. The method of claim 22 and further comprising switching on at least the transmitter part of the cellular communication module if the neighboring cell information changes in a third predefined amount of time.

24. The method according to claim 17, wherein one or more signals comprises WiFi access point information of one or more WiFi networks, wherein one or more external sources comprises one or more WiFi access points in the one or more Wifi networks, wherein a WiFi communication module is configured to receive the WiFi access point information, and wherein the method comprises:
switching off at least the transmitter part of the cellular communication module if the WiFi access point information is unchanged for a fourth predefined amount of time.

25. The method according to claim 24, and further comprising switching on at least the transmitter part of the cellular communication module if the WiFi access point information changes in a fifth predefined amount of time.

26. The method according to claim 17, wherein the tag comprises a location sensor providing a sensed location, wherein the microprocessor selects between at least one of a first aircraft mode and a second aircraft mode on the basis the sensed location, wherein the first aircraft mode comprises switching off and/or on at least the transmitter part of the communication module in response to predefined data in a signal and the second aircraft mode comprises switching off and/or on in response to sensing parameter values in the tag.

27. The method according to claim 17, wherein one or more signals comprises WiFi access point information of one or more WiFi networks, wherein one or more external sources comprises one or more WiFi access points in the one or more Wifi networks, wherein a WiFi communication module is configured to receive the WiFi access point information, and wherein the method comprises:
   switching on at least the transmitter part of the cellular communication module if the WiFi access point information changes in a fourth predefined amount of time.

28. The method according to claim 17, wherein one or more signals comprises neighboring cell information of a cellular network, wherein one or more external sources comprises one or more base stations in the cellular network, wherein the cellular communication module is further configured to receive the neighboring cell information, and wherein the method comprises:
   switching on at least the transmitter part of the cellular communication module if the neighboring cell information changes in a second predefined amount of time.

* * * * *